United States Patent
Jiang et al.

(10) Patent No.: US 12,470,146 B2
(45) Date of Patent: Nov. 11, 2025

(54) POWER SUPPLY CONVERSION CIRCUIT AND POWER SUPPLY CONVERSION METHOD

(71) Applicant: GUANGDONG OPPO MOBILE TELECOMMUNICATIONS CORP., LTD., Guangdong (CN)

(72) Inventors: Senlong Jiang, Guangdong (CN); Chih-Wei Chiu, Guangdong (CN); Jialiang Zhang, Guangdong (CN); Chen Tian, Guangdong (CN); Jun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 464 days.

(21) Appl. No.: 17/943,020

(22) Filed: Sep. 12, 2022

(65) Prior Publication Data
US 2023/0006558 A1    Jan. 5, 2023

Related U.S. Application Data

(63) Continuation of application No. PCT/CN2021/078260, filed on Feb. 26, 2021.

(30) Foreign Application Priority Data

Mar. 12, 2020   (CN) .......................... 202010172196.8

(51) Int. Cl.
*H02M 3/335*  (2006.01)
*H02M 1/14*  (2006.01)
(Continued)

(52) U.S. Cl.
CPC ....... *H02M 3/33523* (2013.01); *H02M 3/156* (2013.01); *H02M 7/04* (2013.01); *H02M 1/14* (2013.01); *H02M 3/005* (2013.01)

(58) Field of Classification Search
CPC .. H02M 3/33523; H02M 3/156; H02M 3/005; H02M 7/04; H02M 1/14
See application file for complete search history.

(56) References Cited

U.S. PATENT DOCUMENTS 5,508,904 A * 4/1996 Hara ................. H02M 3/33546
363/21.11
9,866,122 B2 * 1/2018 Werner ............. H02M 3/33507
(Continued)

FOREIGN PATENT DOCUMENTS

CN         1838517 A     9/2006
CN       101168210 A     4/2008
(Continued)

OTHER PUBLICATIONS

Wang et al., Power Electronics Technology, 4th edition,3.1 Basic Chopper Circuit, Apr. 30, 2021. (24 pages) (Year: 2021).*
(Continued)

*Primary Examiner* — Thienvu V Tran
*Assistant Examiner* — Yahveh Comas Torres
(74) *Attorney, Agent, or Firm* — Young Basile Hanlon & MacFarlane, P.C.

(57) ABSTRACT

Disclosed in the embodiments of the present application is a power conversion circuit, comprising a direct current conversion circuit, a pulse width control circuit, and a transformer. The transformer comprises a primary transformer coil and a secondary transformer coil. The direct current conversion circuit is connected to the primary transformer coil, and is used for adjusting an initial voltage inputted to the direct current conversion circuit to a target voltage. The pulse width control circuit is connected to the primary transformer coil, and is used for generating a pulse square wave on the basis of the target voltage. The primary transformer coil is coupled with the secondary transformer coil. The primary transformer coil is used for generating an
(Continued)

electromagnetic filed according to the pulse square wave, and coupling the electromagnetic field to the secondary transformer coil so that the secondary transformer coil generates an output voltage.

20 Claims, 4 Drawing Sheets

(51) Int. Cl.
    *H02M 3/156*     (2006.01)
    *H02M 7/04*     (2006.01)
    *H02M 3/00*     (2006.01)

(56) References Cited

U.S. PATENT DOCUMENTS

| | | | | |
|---|---|---|---|---|
| 2007/0051712 A1* | 3/2007 | Kooken | ............... | B23K 9/1043 219/130.1 |
| 2011/0216560 A1* | 9/2011 | Ye | ............... | H02M 1/007 363/21.15 |
| 2017/0077818 A1* | 3/2017 | Werner | ............... | H02M 3/33507 |
| 2023/0006557 A1* | 1/2023 | Jiang | ............... | H02J 7/02 |

FOREIGN PATENT DOCUMENTS

| | | | | |
|---|---|---|---|---|
| CN | 101447760 | A | | 6/2009 |
| CN | 101997429 | A | * | 3/2011 |
| CN | 104022661 | A | | 9/2014 |
| CN | 204721234 | U | | 10/2015 |
| CN | 107346940 | A | | 11/2017 |
| CN | 207733021 | U | | 8/2018 |
| CN | 108832822 | A | | 11/2018 |
| CN | 109412452 | A | | 3/2019 |
| CN | 109687743 | A | | 4/2019 |
| CN | 110212748 | A | | 9/2019 |
| CN | 210297565 | U | | 4/2020 |
| EP | 2509205 | A1 | | 10/2012 |
| EP | 3145067 | A2 | * | 3/2017 ............. H02M 1/42 |

OTHER PUBLICATIONS

Machine Translation of CN-101997429-A (Year: 2011).*
Machine Translation CN-101997429-A (Year: 2011).*
Chinese Rejection decision with English Translation for CN Application 202010172196.8 mailed Oct. 29, 2023 (19 pages).
Chinese Second Office Action with English Translation for CN Application 202010172196.8 mailed Jul. 1, 2023. (18 pages).
Chinese Third Office Action with English Translation for CN Application 202010172196.8 mailed Apr. 15, 2023. (16 pages).
Wang et al, Power Electronics Technology, 4th edition,3.1 Basic Chopper Circuit, Apr. 30, 2021. (24 pages).
Chinese Second Office Action with English Translation for CN Application 202010172196.8 mailed Dec. 15, 2022. (13 pages).
Extended European Search Report for EP Application 21766928.2 mailed Jul. 5, 2023. (9 pages).
International Search Report and Written Opinion with English Translation for PCT Application PCT/CN2021/078260 mailed Jun. 2, 2021. (16 pages).
Chinese First Office Action with English Translation for CN Application 202010172196.8, mailed Apr. 27, 2022. (22 pages).
European Examination Report, European Application No. 21766928. 2, mailed Feb. 18, 2025, 5 pages.

* cited by examiner

POWER SUPPLY CONVERSION CIRCUIT AND POWER SUPPLY CONVERSION METHOD

CROSS-REFERENCE TO RELATED APPLICATION(S)

The present application is a continuation-application of International (PCT) Patent Application No. PCT/CN2021/078260, filed on Feb. 26, 2021, which claims priority of Chinese Patent Application No. 202010172196.8, filed on Mar. 12, 2020, the entire contents of both of which are hereby incorporated by reference.

TECHNICAL FIELD

The present disclosure relates to the field of power supplies, and in particular to a power supply conversion circuit and a power supply conversion method.

BACKGROUND

In the art, a power supply conversion circuit may use a capacitor on a primary side to raise a minimum voltage of a primary transformer coil of a transformer to reduce or eliminate an operation dead zone of the transformer, such that the transformer may operate stably. In this way, a power supply conversion circuit may perform output stably. However, a magnitude of the voltage of the primary transformer coil raised by the capacitor may be limited. Therefore, eliminating the operation dead zone of the transformer may be achieved for an input voltage within a limited range. In other words, an effective voltage range of the power supply conversion circuit may be relatively small.

SUMMARY

The present disclosure provides a power supply conversion circuit, the effective voltage range may be improved, and output stability may be improved.

The present disclosure provides following technical solutions.

The present disclosure provides a power supply conversion circuit, including a direct current (DC) conversion circuit, a pulse width control circuit, and a transformer. The transformer includes a primary transformer coil and a secondary transformer coil.

The DC conversion circuit is connected to the primary transformer coil, the pulse width control circuit is connected to the primary transformer coil; and the primary transformer coil is coupled to the secondary transformer coil. The DC conversion circuit is configured to adjust an initial voltage input to the DC conversion circuit based on an operating voltage of the transformer to obtain a target voltage. The pulse width control circuit is configured to generate a pulse square wave based on the target voltage and to add the pulse square wave to the primary transformer coil. The primary transformer coil is configured to induce an electromagnetic field based on the pulse square wave and to couple the electromagnetic field to the secondary transformer coil. The secondary transformer coil is configured to generate an induced current based on the electromagnetic field and to generate an output voltage based on the induced current.

The present disclosure provides a power supply conversion method including:
adjusting, by the DC conversion circuit, the initial voltage input to the DC conversion circuit based on the operating voltage of the transformer to obtain the target voltage, wherein the transformer comprises the primary transformer coil and the secondary transformer coil; generating, by the pulse width control circuit, the pulse square wave based on the target voltage, and adding the pulse square wave to the primary transformer coil; inducting, by the primary transformer coil, the electromagnetic field based on the pulse square wave, and coupling the electromagnetic field to the secondary transformer coil; and generating, by the secondary transformer coil, the induced current based on the electromagnetic field, and generating the output voltage based on the induced current.

DETAILED DESCRIPTION

Figure 1:
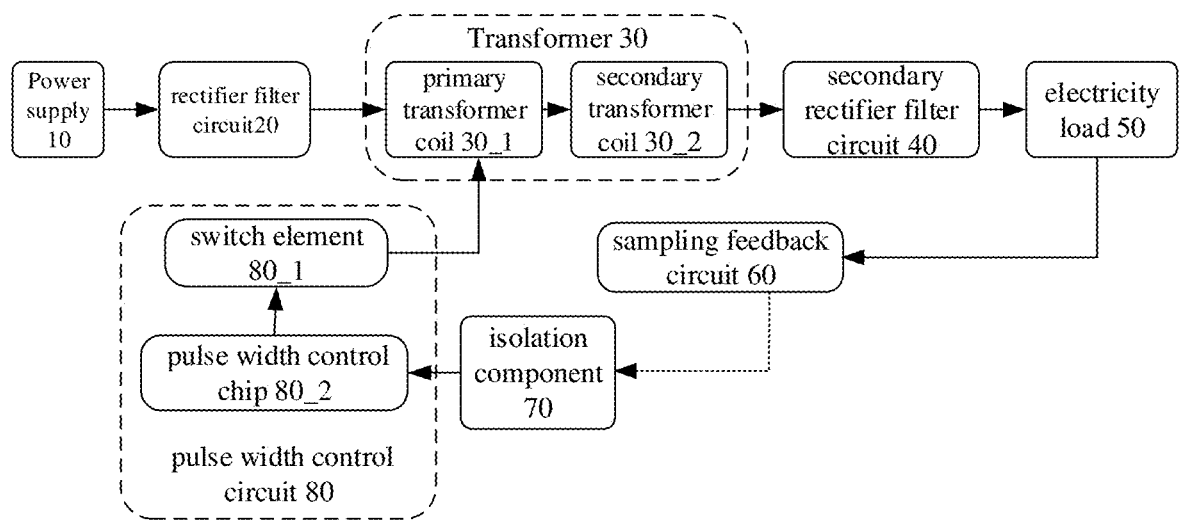
FIG. 1 is a schematic view of a power supply conversion circuit in the art.

A power supply conversion circuit may include an alternating current (AC)-direct current (DC) conversion circuit, a DC-DC conversion circuit, and an AC-AC conversion circuit. For example, when a cell phone that supports a USB fast charging (USB-Power Delivery, USB-PD) protocol is being charged, an AC provided by a power supply needs to be converted into a DC that can be continuously adjustable. Therefore, the AC-DC conversion circuit may be required. FIG. 1 is a schematic view of a power supply conversion circuit in the art. As shown in FIG. 1, a power supply 10 inputs an AC voltage. After the AC voltage passes through a rectifier filter circuit 20, a bun wave is output. The bun wave passes through a pulse width control circuit 80, and a modulated pulse square wave is output. The pulse width control circuit 80 includes a switch element 80_1 and a pulse width control chip 80_2. The pulse width control circuit 80 adds the pulse square wave to a primary transformer coil of a transformer 30, enabling an induced voltage to be generated on a secondary transformer coil. After the induced voltage passes through a secondary rectifier filter circuit 40, a DC voltage is output to an electricity load 50. The output DC voltage is fed back to the pulse width control circuit 80 through a sampling feedback circuit 60 and an isolation component 70. In this way, the pulse width control circuit 80 adjusts the pulse square wave based on a feedback DC signal, allowing the induced voltage generated on the secondary transformer coil to be controlled, such that controlling the output DC voltage may be achieved. A capacitor may be used on a primary side to raise a minimum voltage of the bun wave to eliminate an operation dead zone of the transformer, ensuring the output of the power supply conversion circuit to be stable. However, a magnitude of the voltage raised by the capacitor may be limited. Therefore, for a portion of the bun wave, eliminating the operation dead zone of the transformer may not be achieved by the capacitor.

Technical solutions in embodiments of the present disclosure will be clearly and completely described by referring to the accompanying drawings in the embodiments.

Figure 2:
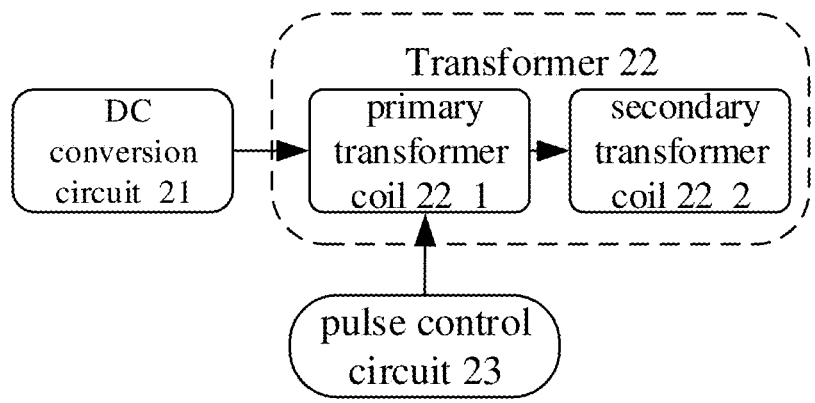
FIG. 2 is a first schematic view of a power supply conversion circuit according to an embodiment of the present disclosure.

The embodiments of the present disclosure provide a power supply conversion circuit. FIG. 2 is a first schematic view of a power supply conversion circuit according to an embodiment of the present disclosure. As shown in FIG. 2, the power supply conversion circuit may include a DC conversion circuit 21, a transformer 22 and a pulse width control circuit 23. The transformer may include a primary transformer coil 22_1 and a secondary transformer coil 22_2. The DC conversion circuit 21 may be connected to the primary transformer coil 22_1, and the pulse width control circuit 23 may be connected to the primary transformer coil 22_1. The primary transformer coil 22_1 may be coupled to the secondary transformer coil 22_2. The DC conversion circuit 21 may be configured to adjust an initial voltage input to the DC conversion circuit 21 based on an operating voltage of the transformer to obtain a target voltage. The pulse width control circuit 23 may be configured to generate a pulse square wave based on the target voltage. The primary transformer coil 22_1 may be configured to induce an electromagnetic field based on the pulse square wave and to couple the electromagnetic field to the secondary transformer coil. The secondary transformer coil 22_2 may be configured to generate an induced current based on the electromagnetic field and to generate an output voltage based on the induced current.

The initial voltage may be a DC voltage provided by the power supply, and the initial voltage may be an input voltage of the power supply conversion circuit. The initial voltage may be input to the DC conversion circuit 21. The initial voltage may be the input voltage of the DC conversion circuit 21. An output voltage of the DC conversion circuit 21 may be the target voltage. The pulse width control circuit 23 may generate the pulse square wave based on the target voltage and may add the pulse square wave to the primary transformer coil 30_1. In this way, a secondary induction voltage may be generated on the secondary transformer coil 30_2, and the secondary induction voltage may be the output voltage of the power supply conversion circuit.

It shall be understood that, a voltage of the pulse square wave may be the same as the target voltage. Therefore, the voltage on the primary transformer coil may be the same as the target voltage. That is, the output voltage of the DC conversion circuit may determine the voltage on the primary transformer coil.

The DC conversion circuit may adjust various initial voltages to be the target voltage. The target voltage may be taken as the voltage on the primary transformer coil, enabling the transformer to operate stably at the target voltage, ensuring the power supply conversion circuit to perform output stably. In this way, the initial voltage may be an effective initial voltage of the power supply conversion circuit, and that is, the DC conversion circuit may increase an effective initial voltage range available for the power supply conversion circuit.

To be noted that, a value of the target voltage may be determined by configuration of the DC conversion circuit. In this way, the transformer may operate at the target voltage, ensuring the transformer to operate stably, such that stable output of the power supply conversion circuit may be achieved.

According to the present disclosure, the power supply conversion circuit is provided. The power supply conversion circuit may include the DC conversion circuit, the pulse width control circuit and the transformer. The transformer may include the primary transformer coil and the secondary transformer coil. The DC conversion circuit may be connected to the primary transformer coil, and the pulse width control circuit may be connected to the primary transformer coil. The primary transformer coil may be coupled to the secondary transformer coil. The DC conversion circuit may be configured to adjust the initial voltage input to the DC conversion circuit based on the operating voltage of the transformer to obtain the target voltage. The pulse width control circuit may be configured to generate the pulse square wave based on the target voltage. The primary transformer coil may be configured to induct an electromagnetic field based on the pulse square wave and to couple the electromagnetic field to the secondary transformer coil. The secondary transformer coil may be configured to generate the induced current based on the electromagnetic field and to generate the output voltage based on the induced current. That is, the DC conversion circuit may adjust various initial voltages into the target voltage, enabling the transformer to operate stably at the target voltage. In this way, the effective voltage range of the power supply circuit may be increased, and the output stability may be improved.

In the present disclosure, the DC conversion circuit may include a boost DC conversion circuit. The boost DC conversion circuit may be configured to increase the initial voltage to the target voltage based on the operating voltage of the transformer.

According to the above embodiments, the boost DC conversion circuit may include: a first inductor, a first switch tube, a first diode and a first capacitor. A first end of the first inductor may be connected to a positive pole of the power supply. A second end of the first inductor may be connected to a positive terminal of the first diode and a first end of the first switch tube. A negative terminal of the first diode may be connected to a positive terminal of the first capacitor. A second end of the first switch tube and a negative terminal of the first capacitor may be connected to a negative pole of the power supply.

In the present embodiments, the boost DC conversion circuit may include at least one of: a BOOST circuit, a BUCK/BOOST circuit, a charge pump circuit, and a CUK circuit.

Figure 3:
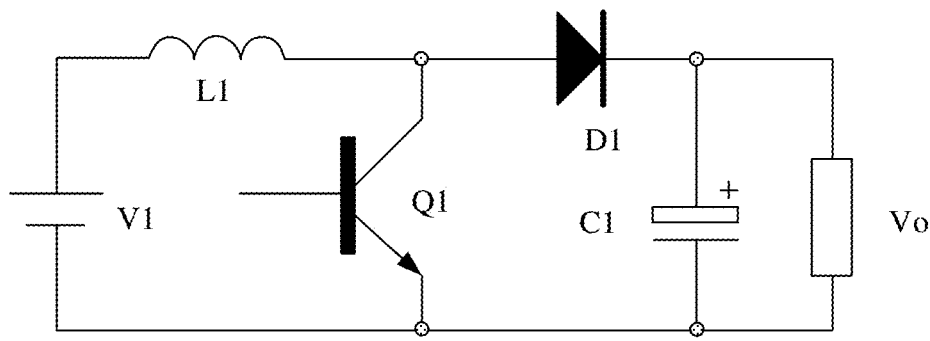
FIG. 3 is a schematic view of topology of a boost direct current conversion circuit according to an embodiment of the present disclosure.

The present disclosure provides a boost DC conversion circuit. As shown in FIG. 3, the boost DC conversion circuit may include: a first inductor L1, a first switch tube Q1, a first diode D1 and a first capacitor C1. The initial voltage provided by the power supply may be V1. A first end of the L1 may be connected to the positive pole of the power supply, and a second end may be connected to a positive terminal of the D1 and a first end of the Q1. A negative terminal of the D1 may be connected to a positive terminal of the C1. A second end of the Q1 and a negative terminal of the C1 may be connected to a negative pole of the power supply.

When the first switch tube Q1 is in a conductive state, the initial voltage V1 may allow the first inductor L1 to be charged, the first diode D1 may be reverse-bias cutoff to prevent the first capacitor C1 from discharging to the ground. In this case, the first capacitor C1 may provide energy to the load. A voltage across two terminals of the first capacitor C1 may be a voltage Vo across two terminals of the load. When the first switch tube Q1 is in a non-conductive state, the first inductor L1 has a reverse electric potential and may slowly discharge. In this case, the first diode D1 may conductive forwardly, the first inductor L1 may discharge through the first diode D1, the first capacitor C1 and the load. The first capacitor C1 may be charged while the first inductor L1 is discharging. The voltage across the two terminals of the first capacitor C1 may be increased. In this way, the output voltage of the boost DC conversion circuit, i.e., the voltage Vo across the two terminals of the load, may be higher than the initial voltage V1 by enabling the first switch tube Q1 to be conductive and non-conductive repeatedly.

To be noted that, a third end of the first switch tube Q1 may be connected to a pulse signal. The first switching tube Q1 may be controlled to be conductive and non-conductive by the pulse signal. A duty cycle of the pulse signal may be adjusted to control the magnitude of the increase of the initial voltage caused by the DC conversion circuit. Therefore, various initial voltages may be increased in various extent, such that the various initial voltages may be raised to reach the target voltage.

It shall be understood that, when the initial voltage is lower than the operating voltage of the transformer, the initial voltage of the power supply conversion circuit may be raised by the boost DC conversion circuit to reach the target voltage, such that the transformer may operate at the target voltage. In this way, for various initial voltages, the transformer may always operate stably, the effective initial voltage range available for the transformer may be expanded.

According to the embodiments of the present disclosure, the DC conversion circuit may include the buck DC conversion circuit. The buck DC conversion circuit may be configured to reduce the initial voltage to the target voltage based on the operating voltage of the transformer.

According to the above embodiments, the buck DC conversion circuit may include: a second inductor, a second switch tube, a second diode and a second capacitor. A first end of the second switch tube may be connected to the positive pole of the power supply, and a second end of the second switch tube may be connected to a first end of the second inductor and a negative terminal of the second diode. A second end of the second inductor may be connected to a positive terminal of the second capacitor. A positive terminal of the second diode and a negative terminal of the second capacitor may be connected to the negative pole of the power supply.

In the embodiments of the present disclosure, the buck DC conversion circuit may include at least one of: the BUCK circuit, the BUCK/BOOST circuit, the charge pump circuit, and the CUK circuit.

Figure 4:
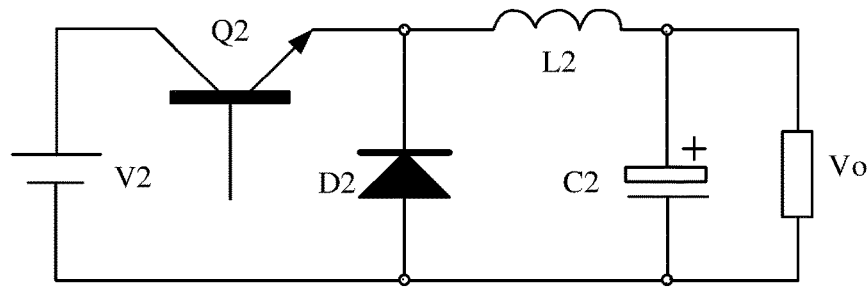
FIG. 4 is a schematic view of topological of a buck direct current conversion circuit according to an embodiment of the present disclosure.

The present disclosure provides a buck DC conversion circuit. As shown in FIG. 4, the buck DC conversion circuit may include: a second inductor L2, a second switch tube Q2, a second diode D2 and a second capacitor C2. The initial voltage provided by the power supply may be V2. A first end of the Q2 may be connected to the positive pole of the power supply. A second end of the Q2 may be connected to a first end of the L2 and a negative terminal of the D2. A second end of L2 may be connected to a positive terminal of the C2. A positive terminal of the D2 and a negative terminal of the C2 may be connected to the negative pole of the power supply.

When the second switch tube Q2 is in a conductive state, the second diode D2 may be in a reverse-bias cutoff state, the initial voltage V2 may enable the second inductor L2 to be charged, and the second capacitor C2 may be charged through the second inductor L2. When the second switch tube Q2 is in the non-conductive state, the second inductor L2 may have a reverse electric potential, enabling the second diode D2 to be conductive forwardly, and the second inductor L2 and the second capacitor C2 may discharge to the load. Since a current of the second inductor gradually decreases in a discharging process, the output voltage of the buck DC conversion circuit, i.e., a voltage Vo across two terminals of the load, may be decreased. Therefore, the output voltage of the buck DC conversion circuit, i.e., the voltage Vo across the two terminals of the load, may be lower than the initial voltage V1 by enabling the second switch tube Q2 to be conductive and non-conductive repeatedly.

To be noted that, a third end of the second switch tube Q2 may be connected to the pulse signal. The second switch tube Q2 may be controlled to be conductive and non-conductive by the pulse signal. The duty cycle of the pulse signal may be adjusted to control the magnitude of the decrease of the initial voltage caused by the DC conversion circuit. Therefore, various initial voltages may be decreased in various extent, such that various input voltages may be decreased to reach the target voltage.

It shall be understood that, when the initial voltage is higher than the operating voltage of the transformer, the initial voltage of the power supply conversion circuit may be decreased by increasing the buck DC conversion circuit, such that the initial voltage may be reduced to reach the target voltage. In this way, for various initial voltages, the transformer may always operate stably, the effective initial voltage range available for the transformer may be expanded.

In the embodiments of the present disclosure, the DC conversion circuit may include the boost-buck DC conversion circuit. The boost-buck DC conversion circuit may be configured to increase or to decrease the initial voltage to the target voltage based on the operating voltage of the transformer.

According to the above embodiments, the buck DC conversion circuit may include: a third inductor, a third switch tube, a third diode and a third capacitor. A first end of the third switch tube may be connected to the positive pole of the power supply. A second end of the third switch tube may be connected to a first end of the third inductor and a negative terminal of the third diode. A positive terminal of the third diode may be connected to a negative terminal of the third capacitor. A second end of the third inductor and a positive terminal of the third capacitor may be connected to the negative pole of the power supply.

In some embodiments, the boost-buck DC conversion circuit may be a BUCK/BOOST circuit.

Figure 5:
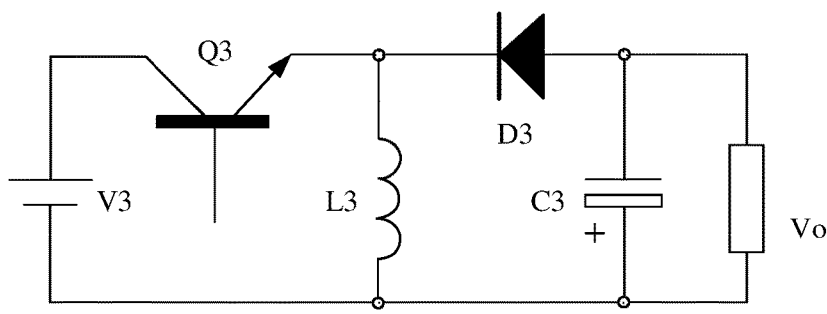
FIG. 5 is a schematic view of topological of a boost-buck direct current conversion circuit according to an embodiment of the present disclosure.

The present disclosure provides a boost-buck DC conversion circuit. As shown in FIG. 5, the boost-buck DC conversion circuit may include: a third inductor L3, a third switch tube Q3, a third diode D3 and a third capacitor C3. The initial voltage provided by the power supply may be V3. A first end of the Q3 may be connected to the positive pole of the power supply. A second terminal of the Q3 may be connected to a first end of the L3 and a negative terminal of the D3. A positive terminal of the D3 may be connected to a negative terminal of the C3. A second end of the L3 and a positive terminal of the C3 may be connected to the negative pole of the power supply.

When the third switch tube Q3 is in a conductive state, the third diode D3 may be in a reverse-bias cutoff state, the initial voltage V3 may enable the third inductor L3 to be charged, and the third capacitor C3 may supply power to the load. When the third switch tube Q3 is in the non-conductive state, and when the electric potential across two terminals of the third inductor L3 is greater than the voltage across two terminals of the third capacitor C3, the third diode D3 may be in the conductive state, the third inductor L3 may charge the third capacitor C3 and at the same time supply power to the load. The voltage Vo across the two terminals of the load may be the output voltage of the buck DC conversion circuit.

To be noted that, polarity of the output voltage of the boost DC conversion circuit may be opposite to polarity of the input voltage of the boost-buck DC conversion circuit.

A third end of the third switch tube Q3 may be connected to the pulse signal. The third switch tube Q3 may be controlled to be conductive and non-conductive by the pulse signal. The duty cycle of the pulse signal may be adjusted to control the boost-buck circuit to be in a boost mode or in a buck mode. In the boost mode, the boost-buck DC conversion circuit may perform boost transformation. Adjusting the duty cycle of the pulse signal in the boost mode may control the magnitude that the voltage is increased. In the buck mode, the boost-buck DC conversion circuit may perform buck transformation. Adjusting the duty cycle of the pulse signal in the buck mode may control the magnitude that the voltage is decreased. Therefore, the initial voltage may be adjusted to reach the target voltage by adjusting the duty cycle of the pulse signal.

It shall be understood that, the boost-buck DC conversion circuit may perform voltage boost or voltage buck on the initial voltage of the power supply conversion circuit to increase or decrease the initial voltage to teach the operating voltage of the transformer. In this way, for various initial voltages, the transformer may always operate stably, and the effective initial voltage range available for the transformer may be expanded.

To be noted that, each of the first switch tube, the second switch tube and the third switch tube may be a triode, a metal-oxide-semiconductor field-effect transistor (MOSFET), or any other element that may control the circuit to be conductive and non-conductive. The present disclosure does not limit a type of the switch tube.

In addition, since a voltage when the MOSFET is in the conductive state is less than a voltage when the diode is in the conductive state, the MOSFET may be configured as each of the first diode, the second diode and the third diode. In this way, a power loss may be reduced, and a conversion efficiency of the DC conversion circuit may be improved.

In some embodiments, the boost-buck conversion circuit may be a charge pump.

In this case, the charge pump may be a switch regulator boost pump, a non-adjustable capacitor charge pump, an adjustable capacitor charge pump, or a charge pump circuit in another type. A type of the charge pump may be determined based on actual demands, and will not be limited by the present disclosure.

It shall be understood that, the DC conversion circuit may efficiently adjust the input voltage within a certain range to reach the target voltage. For any initial voltage, in response to the initial voltage being required to be adjusted to reach the target voltage, a first stage DC conversion circuit may adjust the initial voltage to reach an intermediate voltage, enabling the intermediate voltage to be taken as an input voltage of a next stage DC conversion circuit. Finally, the intermediate voltage may be converted to reach the target voltage.

For example, the DC conversion circuit may include the boost DC conversion circuit and/or the buck DC conversion circuit. For example, the target voltage may be 230 V. When the initial voltage is 215 V, the boost DC conversion circuit may increase 215 V to reach 230 V. Alternatively, the first stage boost DC conversion circuit may increase 215 V to reach 225 V, and subsequently, a second stage boost DC conversion circuit may increase 225 V to reach 230 V. Alternatively, the boost DC conversion circuit may increase 215 V to reach 260 V, and subsequently, the buck DC conversion circuit may decrease 260 V to reach 230 V. In this way, the boost DC conversion circuit may be the boost-buck DC conversion circuit in the boost mode, and the buck DC conversion circuit may be the boost-buck DC conversion circuit in the buck mode.

To be noted that, in the embodiments of the present disclosure, the DC conversion circuit may be any circuit capable of converting the input voltage of the DC conversion circuit into an output voltage having a variable voltage value and variable polarity. A type and topology of the DC conversion circuit may be determined based on actual demands, and will not be limited by the present disclosure.

In the embodiments of the present disclosure, the power supply conversion circuit may further include a feedback circuit. The feedback circuit may be configured to feed the output voltage back to the pulse width control circuit, such that the pulse width control circuit may adjust the pulse square wave.

It shall be understood that, the feedback circuit may sample the output voltage of the power supply conversion circuit and feed the sampled output voltage back to the primary transformer coil. Therefore, the pulse width control circuit may obtain the output voltage of the power supply conversion circuit through the primary transformer coil, and may control a width of the pulse square wave based on the output voltage of the power supply conversion circuit, such that the pulse width control circuit may control the electromagnetic field induced on the primary transformer coil to further control the induced current on the secondary transformer coil. In this way, the output voltage of the power supply conversion circuit may be controlled, and the output voltage of the power supply conversion circuit may be converted into a voltage required by the load of an electronic device.

The feedback circuit may isolate feedback through an optocoupler member. For example, the sampled output voltage may be divided by a resistor. Subsequently, the divided voltage may be fed back to the primary transformer coil through a comparator with the optocoupler member. The feedback circuit may perform feedback through the feedback coil on the primary transformer coil. For example, the sampled output voltage may be fed back directly to the primary transformer coil. Further, the sampled output voltage may be divided by a resistor in a primary circuit, and transmitted to the pulse width control circuit subsequently. A feedback mode of the feedback circuit may be determined based on demands and will not be limited by the present disclosure.

In the embodiments of the present disclosure, the power supply conversion circuit may further include a first input capacitor. The first input capacitor may be connected in parallel with the DC conversion circuit and may be configured to increase the initial voltage, enabling the initial voltage to be not lower than a minimum operating voltage of the DC conversion circuit.

It shall be understood that, the first input capacitor may be connected in parallel with the DC conversion circuit before the DC conversion circuit, to increase the input voltage of the DC conversion circuit, enabling the input voltage of the DC conversion circuit to be not lower than the minimum operating voltage of the DC conversion circuit, such that the operation of the DC conversion circuit may be supported effectively.

To be noted that, when the first input capacitor is connected to a rectifier circuit after the rectifier circuit, the first input capacitor may further filter an output voltage of the rectifier circuit. Therefore, a value of the first input capacitor may be related to the load of the power supply conversion circuit, and an AC ripple in the circuit may be reduced effectively when an appropriate first input capacitor is determined.

The first input capacitor may be a variable capacitor or a trimmer capacitor in addition to a fixed capacitor. In this way, the value of the first input capacitor may be adjusted based on the load to achieve an optimal filtering and boost effect. A type of the first input capacitor may be determined based on actual demands and will not be limited by the present disclosure.

In the embodiments of the present disclosure, when the initial voltage is an AC voltage, the power supply conversion circuit may further include a primary rectifier circuit. The primary rectifier circuit may be connected to the DC conversion circuit. The primary rectifier circuit may be configured to convert the AC voltage to the DC voltage, and to output the DC voltage to the DC conversion circuit.

The primary rectifier circuit may be a half-wave rectifier circuit, a full-wave rectifier circuit, a bridge rectifier circuit, a voltage doubling rectifier circuit, or a rectifier circuit in other types. A type of the primary rectifier circuit may be determined based on actual demands and will not be limited by the present disclosure.

The primary rectifier circuit may be connected in parallel with the first input capacitor. That is, when the input voltage of the power supply conversion circuit is the AC voltage, the primary rectifier circuit may convert the AC voltage into the DC voltage. The first input capacitor may perform a filtering operation on the DC voltage, and at the same time, the DC voltage may be boosted, such that a minimum voltage of the DC voltage may be increased. Subsequently, the boosted DC signal may be input to the DC conversion circuit.

It shall be understood that, the rectifier circuit may convert the AC voltage into the DC voltage. Therefore, when the power supply conversion circuit includes the primary rectifier circuit, and when the power supply provides the AC voltage, power supply conversion may be performed on the AC voltage, and the AC voltage may be converted into the AC voltage; alternatively, the AC voltage may be converted into the DC voltage, such that the output voltage may meet the requirements for the electronic device to operate.

Figure 6:
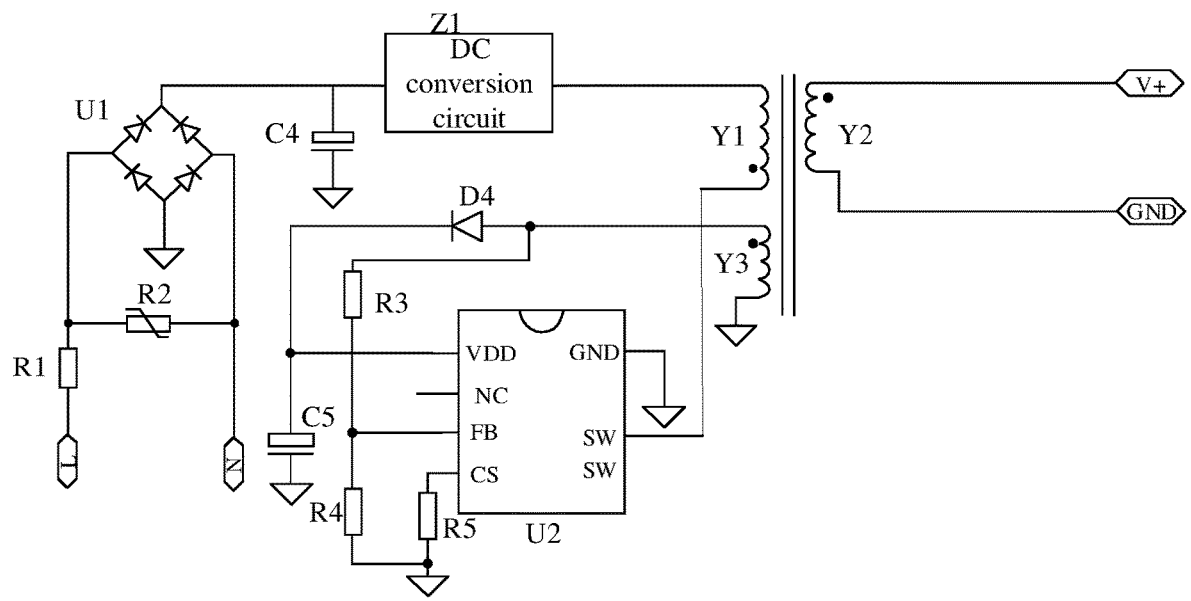
FIG. 6 is a second schematic view of a power supply conversion circuit according to an embodiment of the present disclosure.

FIG. 6 is a second schematic view of a power supply conversion circuit according to an embodiment of the present disclosure. As shown in FIG. 6, the rectifier circuit, the input capacitor C4, the DC conversion circuit Z1, the primary transformer coil Y1 and the pulse width control circuit U2 may be connected in sequence. The feedback circuit may be connected to the pulse width control circuit and the feedback coil Y3. The secondary transformer coil Y2 may be coupled with the primary transformer coil Y1.

The rectifier circuit may include a rectifier bridge U1, a resistor R1 and a varistor R2. The power supply may provide the AC voltage. After the AC voltage passes through the rectifier bridge U1, a bun wave may be output. After the bun wave passes through the input capacitor C4, a voltage value may be increased, and at the same time, the minimum voltage of the bun wave may be increased. In this way, the voltage value of the bun wave may be within an operating range of the DC conversion circuit Z1, ensuring that the DC conversion circuit Z1 can stably output the target voltage.

The pulse width control circuit may include a pulse width control chip U2 and a resistor R5. The pulse width control chip U2 may receive a feedback signal, output a pulse square wave based on the feedback signal, and add the pulse square wave to the primary transformer coil Y1.

The feedback circuit may include the feedback coil Y3, a diode D4, a capacitor C5, a resistor R3 and a resistor R4. The feedback coil Y3 may sense a voltage change of the secondary transformer coil Y2 and obtain a feedback signal of secondary transformer coil Y2. After voltage division by the resistor R4 and the resistor R3, the feedback coil Y3 may input the feedback signal to an FB port of the pulse width control chip U2. In this way, the feedback signal received by the FB port may be adjusted by adjusting a ratio of a resistance value of the resistor R4 and a resistance value of the resistor R3. The pulse width control chip U2 may output the pulsed square wave based on the received feedback signal, such that the output voltage V+ generated on the secondary transformer coil Y2 may be adjusted.

Figure 7:
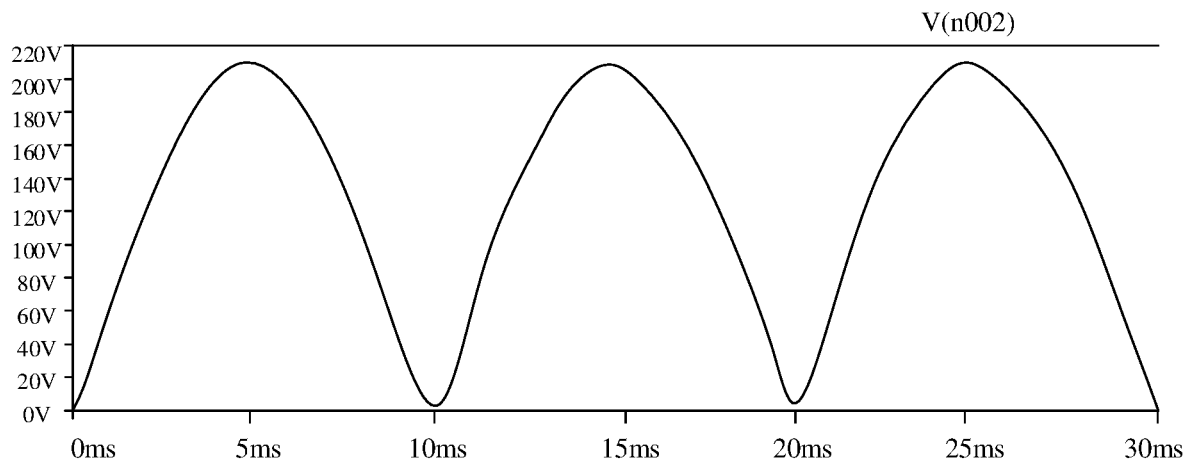
FIG. 7 is a first waveform curve according to an embodiment of the present disclosure.
Figure 8:
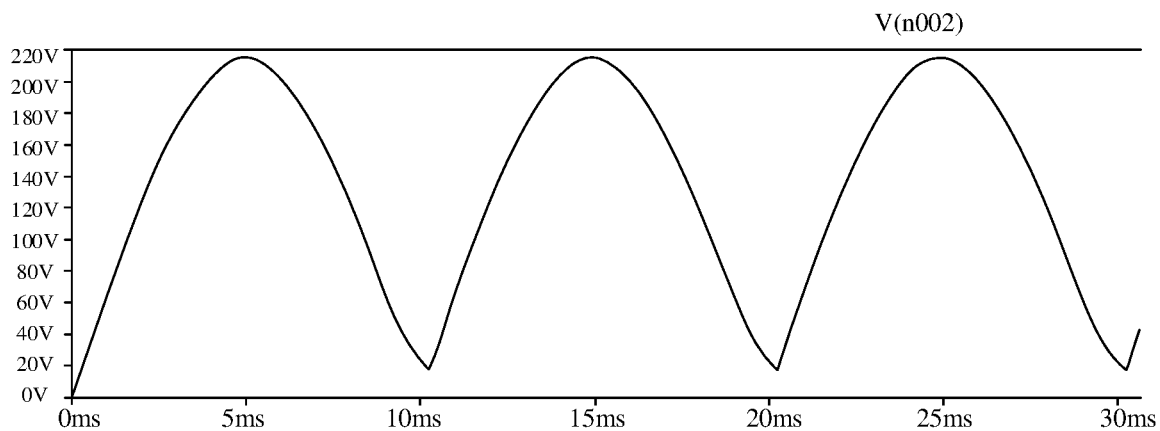
FIG. 8 is a second waveform curve according to an embodiment of the present disclosure.

For example, the power supply may provide an AC voltage of 220 V. A sine wave of the AC voltage may pass through the rectification circuit, and the bun wave may be output. As shown in FIG. 7, a lowest point of the voltage amplitude may approach to 0 V. After the bun wave passes through the capacitor C4, the minimum voltage may be raised, and a waveform of the output wave may be shown in FIG. 8. When a load power at an output peak is 120 W, and when the input capacitor C4 is 100 μF, operation of the DC conversion circuit may be supported effectively. For example, the minimum voltage of the bun wave may be increased to reach 4 V, a DC conversion circuit having the minimum operating voltage of not less than 4 V may be applied.

To be noted that, the resistor R4 and the resistor R3 may be variable resistors. The resistance ratio of the resistor R4 and the resistor R3 may be controlled by adjusting the resistance value of the resistor R4 and the resistance value of the resistor R3, such that the output voltage on the secondary transformer coil may be adjusted.

It shall be understood that, the DC conversion circuit, which may operate stably, may enable the voltage applied to the primary transformer coil to be stable, such that the output voltage induced by the secondary transformer coil may be stable and may not change from a peak value to a trough value as the AC signal changes. In this way, dead zones may not be present in the output of the transformer, and the power supply conversion circuit may operate stably.

In the embodiments of the present disclosure, the power supply conversion circuit may further include a secondary rectifier filter circuit. The secondary rectifier filter circuit may be connected to the secondary transformer coil. The secondary rectifier filter circuit may be configured to filter the output voltage and to convert the output voltage from the AC voltage to the DC voltage.

To be noted that, the secondary rectifier filter circuit may include a secondary rectifier circuit and a secondary filter circuit. The secondary rectifier circuit may be configured to convert the output voltage of the secondary transformer coil from the AC voltage to the DC voltage. The secondary filter circuit may be configured to filter the output voltage of the secondary rectifier circuit to reduce the AC ripple in the output voltage of the secondary rectifier circuit, such that the output voltage of the rectifier circuit may be relatively smooth.

The secondary rectifier circuit may be a half-wave rectifier circuit, a full-wave rectifier circuit, a bridge rectifier circuit, a voltage doubling rectifier circuit, or a rectifier circuit in any other type. The type of the secondary rectifier circuit may be determined based on actual demands and will not be limited by the present disclosure.

The filter circuit may be a passive filter circuit or an active filter circuit. The type of the filter circuit may be determined based on actual demands and will not be limited by the present disclosure.

Figure 9:
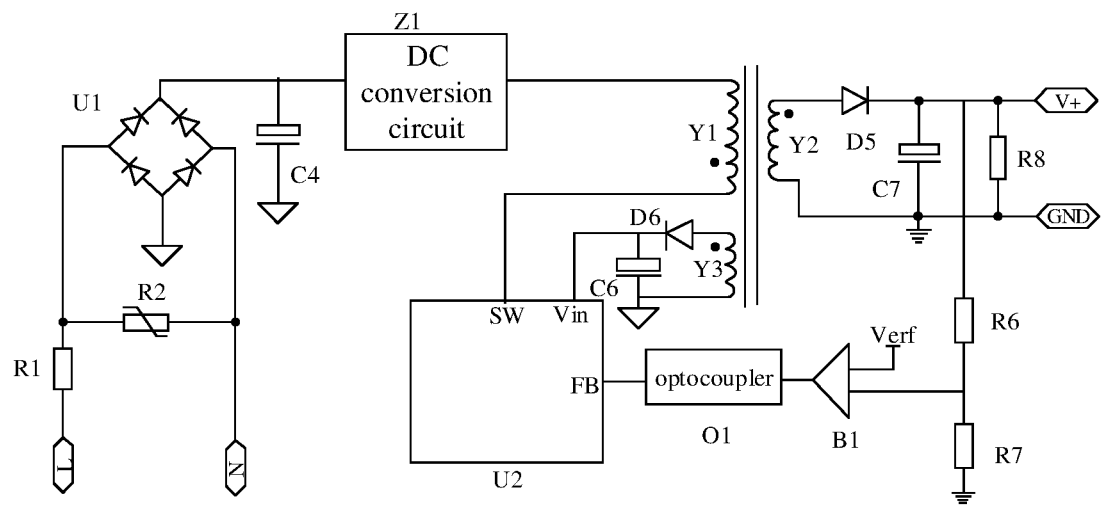
FIG. 9 is a third schematic view of a power supply conversion circuit according to an embodiment of the present disclosure.

FIG. 9 is a third schematic view of a power supply conversion circuit according to an embodiment of the present disclosure. As shown in FIG. 9, the rectifier circuit, the input capacitor C4, the DC conversion circuit Z1, the primary varactor coil Y1 and the pulse width control circuit may be connected in sequence. The feedback circuit may be connected to the pulse width control circuit and the feedback coil Y3. The secondary varactor coil Y2 may be connected to the secondary rectifier filter circuit.

The rectifier circuit may include a rectifier bridge U1, a resistor R1 and a voltage sensitive resistor R2. The power supply may provide the AC voltage. After the AC voltage passes through the rectifier bridge U1, a bun wave may be output. After the bun wave passes through the capacitor C4, a voltage amplitude may be increased, and a minimum voltage may be increased, such that the voltage amplitude of the bun wave may be within an operating range of the DC conversion circuit Z1, ensuring the stable output of the DC conversion circuit Z1 to be the target voltage.

The pulse width control circuit may include a pulse width control chip U2, a diode D6 and a capacitor C6. The feedback coil Y3 may supply power to the pulse width control chip U2 through the diode D6 and the capacitor C6, receive a feedback signal, generate a pulse square wave based on the feedback signal, and add the pulse square wave to the primary variable voltage coil.

The feedback circuit may include a resistor R6, a resistor R7, a comparator B1 and an optocoupler O1. The output voltage may be divided by the resistor R7 and the resistor R6 and then fed back to the pulse width control chip U2 through the comparator B1 and the optocoupler O1. An input port of the comparator B1 may receive the divided output voltage, and another input port may receive a reference voltage Verf.

To be noted that the optocoupler may further serve as an isolation component for isolation.

The secondary rectifier filter circuit may include a diode D5, a capacitor C7 and a resistor R8.

It shall be understood that, the induced voltage of the secondary transformer coil may be the AC voltage. When the load needs the DC voltage, the secondary rectifier filter circuit may be arranged in the secondary circuit to filter the AC voltage, and at the same time, the AC voltage output from the secondary transformer coil may be converted into the DC voltage.

In the embodiments of the present disclosure, the power supply conversion circuit may further include an isolation component. The isolation component may be arranged between the primary transformer coil and the secondary transformer coil and may be configured to isolate the primary transformer coil from the secondary transformer coil, such that the primary transformer coil may be insulated with the secondary transformer coil.

In the present disclosure, the isolation component may be an optical isolator, a digital isolator, or a capacitor. In the present disclosure, a type of isolation component may be determined based on actual demands and will not be limited by the present disclosure.

It shall be understood that, the isolation component may insulate the primary circuit from the secondary circuit to achieve resistance against electromagnetic interference.

Figure 10:
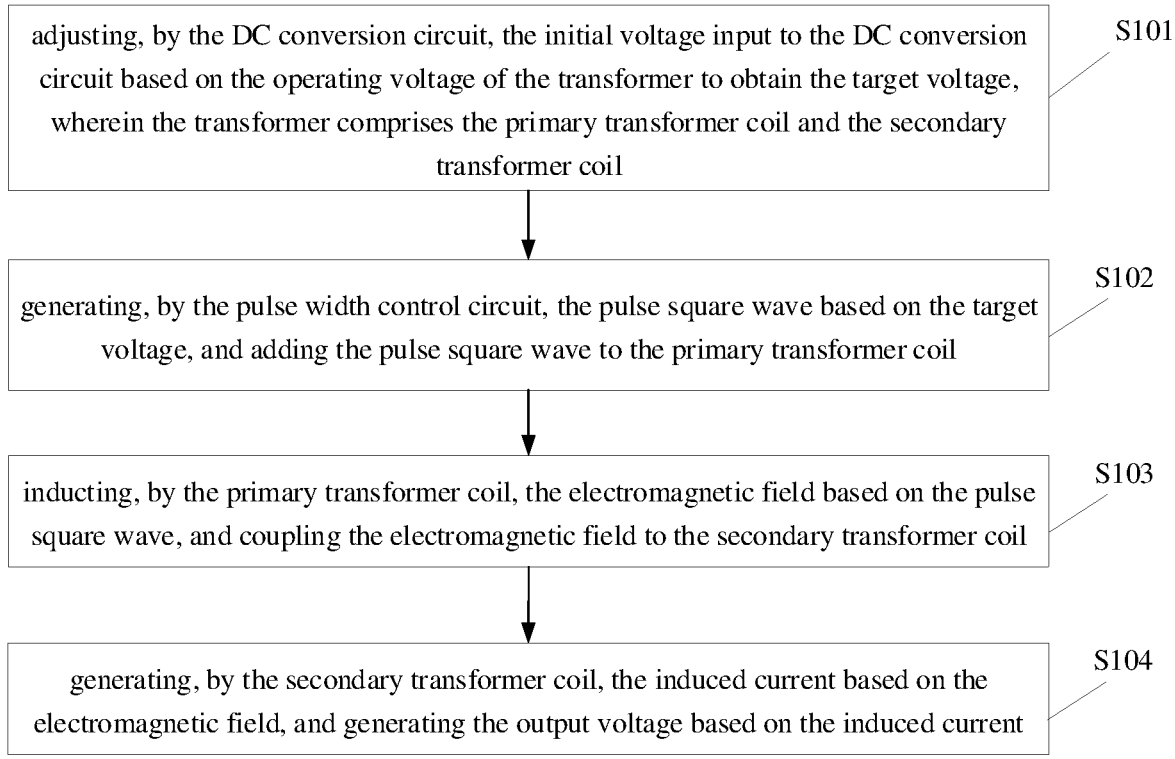
FIG. 10 is a flow chart of a power supply conversion method according to an embodiment of the present disclosure.

The present disclosure provides a power supply conversion method, which may be applied to the above power supply conversion circuit. As shown in FIG. 10, the method may include following operations.

In an operation S101, the initial voltage input to the DC conversion circuit may be adjusted by the DC conversion circuit based on the operating voltage of the transformer to obtain the target voltage. The transformer may include the primary transformer coil and the secondary transformer coil.

In an operation S102, the pulse square wave may be generated by the pulse width control circuit based on the target voltage, and the pulse square wave may be added to the primary transformer coil.

In an operation S103, the electromagnetic field may be induced by the primary transformer coil based on the pulse square wave, and the electromagnetic field may be coupled to the secondary transformer coil.

In an operation S104, the induced current may be generated by the secondary transformer coil based on the electromagnetic field, and the output voltage may be generated by the secondary transformer coil based on the induced current.

In the embodiments of the present disclosure, in order to ensure the operating voltage of the transformer, the DC conversion circuit may adjust the initial voltage to obtain the target voltage, and the pulse width control circuit may generate the pulse square wave based on the target voltage. In this way, the pulse square wave may be added to the primary transformer coil, enabling the transformer to operate stably.

In the embodiments of the present disclosure, the pulse square wave may be added to the primary transformer coil, allowing the induced electromagnetic field to be generated, such that a magnetic pole transformer coil may generate the induced current based on the induced electromagnetic field to generate the output voltage.

It shall be understood that, the DC conversion circuit may adjust the initial voltage into the target voltage, enabling the transformer to operate stably at the target voltage, expanding the effective voltage range of the power supply circuit, and improving the output stability.

In some embodiments, the DC conversion circuit may include the boost DC conversion circuit. The power supply conversion circuit may increase the initial voltage to reach the target voltage through the boost DC conversion circuit based on the operating voltage of the transformer.

In the embodiments of the present disclosure, the boost DC conversion circuit may be at least one of: the BOOST circuit, the BUCK/BOOST circuit, the charge pump circuit, and the CUK circuit.

For example, the initial voltage may be 210 V and the target voltage may be 230 V. In this case, the power supply conversion circuit may increase the 210 V to reach 230 V through the BOOST circuit.

In some embodiments, the DC conversion circuit may include the buck DC conversion circuit. The power supply conversion circuit may reduce the initial voltage to reach the target voltage through the buck DC conversion circuit, based on the operating voltage of the transformer.

In the embodiments of the present disclosure, the buck DC conversion circuit may be at least one of: the BUCK circuit, the BUCK/BOOST circuit, the charge pump circuit, and the CUK circuit.

For example, the initial voltage may be 210 V and the target voltage may be 200 V. In this case, the power supply conversion circuit may reduce the 210 V to reach 200 V through the BUCK circuit.

In some embodiments, the DC conversion circuit may include the boost-buck DC conversion circuit. The power supply conversion circuit may increase the initial voltage to reach the target voltage, or reduce the initial voltage to reach the target voltage through the boost-buck DC conversion circuit based on the operating voltage of the transformer.

In the embodiments of the present disclosure, the boost-buck DC conversion circuit may include the boost mode and the buck mode. In the boost mode, the boost-buck DC conversion circuit may increase the input voltage of the boost-buck DC conversion circuit to reach the target voltage. In the buck mode, the boost-buck DC conversion circuit may reduce the input voltage of the boost-buck DC conversion circuit to reach the target voltage.

To be noted that, the operating mode of the boost-buck DC conversion circuit being be boost mode or the buck mode may be determined based on actual demands and will not be limited by the present disclosure.

For example, the initial voltage may be 210 V and the target voltage may be 200 V. In this case, the boost-buck DC conversion circuit may be enabled to operate in the buck mode and may reduce the initial voltage 210 V to reach 200 V. When the initial voltage is 180 V and the target voltage is 200 V, the boost-buck DC conversion circuit may be enabled to operate in the boost mode, and may increase the initial voltage 180 V to reach 200 V.

It shall be understood that, the operating mode of the boost-buck DC conversion circuit may be set to adjust the initial voltage, which is higher than the target voltage, and the initial voltage, which is lower than the target voltage, to reach the target voltage. In this way, the transformer may always operate stably when various initial voltages are applied, expanding the effective initial voltage range available for the transformer.

In some embodiments, the power supply conversion circuit may feed the output voltage back to the pulse width control circuit through the feedback circuit, allowing the pulse width control circuit to adjust the pulse square wave.

In some embodiments, the power supply conversion circuit may increase the initial voltage through a first input capacitor, enabling the initial voltage to be not lower than the minimum operating voltage of the DC conversion circuit.

In some embodiments, the power supply conversion circuit may rectify the AC voltage through the primary rectifier circuit, convert the AC voltage to the DC voltage, and output the DC voltage to the DC conversion circuit.

In some embodiments, the power supply conversion circuit may filter the output voltage through the secondary rectifier filter circuit, and at the same time, convert the output voltage from the AC voltage to the DC voltage.

In some embodiments, the power supply conversion circuit may isolate the primary transformer coil from the secondary transformer coil through the isolation component, enabling the primary transformer coil to be insulated from the secondary transformer coil.

To be noted that, the feedback circuit, the first input capacitor, the primary rectifier circuit, the secondary rectifier filter circuit and the isolation component are described in detail for the power supply conversion circuit and will not be repeated here.

Any ordinary skilled person in the art shall understand that, embodiments of the present disclosure may provide methods, systems, or computer program products. Therefore, the present application may take forms of a hardware embodiment, a software embodiment, or a combination of software and hardware. Further, the present application may take the form of a computer program product implemented on one or more computer-usable storage media (including, but not limited to, a disk memory, an optical memory, and so on) containing computer-usable program codes.

The present disclosure is described by referring to a flow chart and/or a block diagram of a method, a device (a system), and a computer program product in the embodiments of the present disclosure. It shall be understood that each process and/or block in the flow chart and/or in the diagram, and combination of processes and/or blocks in the flow chart and/or in the diagram, may be implemented by computer program instructions. These computer program instructions may be provided to a processor of a general purpose computer, a specialized computer, an embedded processor, or other programmable data processing device to produce a machine such that instructions executed by a processor of a computer or other programmable data processing apparatus may produce a device for performing a function specified in one or more processes of a flow chart and/or one or more blocks of a block diagram.

The computer program instructions may also be stored in a computer readable memory capable of directing a computer or other programmable data processing device to operate in a particular manner, such that the instructions stored in the computer readable memory may produce an article of manufacture including an instruction device. The instruction device may implement the function specified in one or more processes of the flow chart and/or one or more blocks of the block diagram.

The computer program instructions may also be loaded onto a computer or other programmable data processing device such that a series of operations are performed on the computer or the programmable device to produce computer-implemented processing, such that the instructions executed on the computer or the programmable device provide operations for implementing the functions specified in one or more processes of the flow chart and/or one or more blocks of the block diagram.

The above description shows only preferable examples of the present disclosure and does not limit the scope of the present disclosure.

Industrial Practicality

In embodiments of the present disclosure, the DC conversion circuit may adjust various initial voltages to reach the target voltage, such that the transformer may operate stably at the target voltage. In this way, the effective voltage range of the power supply conversion circuit may be expanded, and stability of the output may be improved.

What is claimed is:

1. A power supply conversion circuit, comprising a direct current (DC) conversion circuit, a pulse width control circuit, and a transformer, wherein, the transformer comprises a primary transformer coil and a secondary transformer coil;

the DC conversion circuit is connected to the primary transformer coil, the pulse width control circuit is connected to the primary transformer coil; and the primary transformer coil is coupled to the secondary transformer coil;

the DC conversion circuit is configured to adjust an initial voltage input to the DC conversion circuit based on an operating voltage of the transformer to obtain a target voltage, wherein the target voltage is applied to the primary transformer coil;

the pulse width control circuit is configured to generate a pulse square wave based on the target voltage and to add the pulse square wave to the primary transformer coil, wherein a voltage of the pulse square wave is the same as the target voltage;

the primary transformer coil is configured to induce an electromagnetic field based on the pulse square wave and to couple the electromagnetic field to the secondary transformer coil; and the secondary transformer coil is configured to generate an induced current based on the electromagnetic field and to generate an output voltage based on the induced current.

2. The power supply conversion circuit according to claim 1, wherein the DC conversion circuit comprises a boost DC conversion circuit; and the boost DC conversion circuit is configured to increase the initial voltage to reach the target voltage based on the operating voltage of the transformer.

3. The power supply conversion circuit according to claim 2, wherein the boost DC conversion circuit comprises: a first inductor, a first switch tube, a first diode and a first capacitor;

a first end of the first inductor is connected to a positive pole of a power supply, a second end of the first inductor is connected to a positive terminal of the first diode and a first end of the first switch tube;

a negative terminal of the first diode is connected to a positive terminal of the first capacitor; and a second end of the first switch tube and a negative terminal of the first capacitor are connected to a negative pole of the power supply;

or wherein the boost DC conversion circuit comprises at least one of: a BOOST circuit, a BUCK/BOOST circuit, a charge pump circuit, and a CUK circuit.

4. The power supply conversion circuit according to claim 1, wherein the DC conversion circuit comprises a buck DC conversion circuit; and the buck DC conversion circuit is configured to reduce the initial voltage to reach the target voltage based on the operating voltage of the transformer.

5. The power supply conversion circuit according to claim 4, wherein the buck DC conversion circuit comprises: a second inductor, a second switch tube, a second diode and a second capacitor;

a first end of the second switch tube is connected to a positive pole of the power supply, and a second end of the second switch tube is connected to a first end of the second inductor and a negative terminal of the second diode;

a second end of the second inductor is connected to a positive terminal of the second capacitor; and a positive terminal of the second diode and a negative terminal of the second capacitor are connected to a negative pole of the power supply;

or wherein the buck DC conversion circuit comprises at least one of: a BUCK circuit, a BUCK/BOOST circuit, a charge pump circuit, and a CUK circuit.

6. The power supply conversion circuit according to claim 1, wherein the DC conversion circuit comprises a boost-buck DC conversion circuit; and the boost-buck DC conversion circuit is configured to increase or to decrease the initial voltage to reach the target voltage based on the operating voltage of the transformer.

7. The power supply conversion circuit according to claim 6, wherein the boost-buck DC conversion circuit comprises: a third inductor, a third switch tube, a third diode and a third capacitor;

a first end of the third switch tube is connected to a positive pole of a power supply, a second end of the third switch tube is connected to a first end of the third inductor and a negative terminal of the third diode;

a positive terminal of the third diode is connected to a negative terminal of the third capacitor; and a second end of the third inductor and a positive terminal of the third capacitor are connected to a negative pole of the power supply.

8. The power supply conversion circuit according to claim 1, further comprising a feedback circuit;

wherein the feedback circuit is configured to feed the output voltage back to the pulse width control circuit to enable the pulse width control circuit to adjust the pulse square wave.

9. The power supply conversion circuit according to claim 8, wherein the feedback circuit comprises a feedback coil, the feedback coil is configured to sense a voltage change of the secondary transformer coil and obtains a feedback signal of the secondary transformer coil.

10. The power supply conversion circuit according to claim 1, further comprising a first input capacitor;

wherein the first input capacitor is connected in parallel with the DC conversion circuit; and the first input capacitor is configured to increase the initial voltage, enabling the initial voltage to be not lower than a minimum operating voltage of the DC conversion circuit.

11. The power supply conversion circuit according to claim 1, further comprising a primary rectifier circuit in response to the initial voltage being an alternating current (AC) voltage, wherein the primary rectifier circuit is connected to the DC conversion circuit; and the primary rectifier circuit is configured to perform a rectifying operation on the AC voltage, convert the AC voltage to a DC voltage, and output the DC voltage to the DC conversion circuit.

12. The power supply conversion circuit according to claim 1, further comprising a secondary rectifier filter circuit;

wherein the secondary rectifier filter circuit is connected to the secondary transformer coil; and the secondary rectifier filter circuit is configured to filter the output voltage and to convert the output voltage from an AC voltage to a DC voltage.

13. The power supply conversion circuit according to claim 1, further comprising an isolation component;

wherein the isolation component is arranged between the primary transformer coil and the secondary transformer coil and is configured to isolate the primary transformer coil from the secondary transformer coil, allowing the primary transformer coil to be insulated from the secondary transformer coil.

14. A power supply conversion method, applied to a power supply conversion circuit,
wherein the power supply conversion circuit comprises a direct current (DC) conversion circuit, a pulse width control circuit, and a transformer;
the transformer comprises a primary transformer coil and a secondary transformer coil;
the DC conversion circuit is connected to the primary transformer coil, the pulse width control circuit is connected to the primary transformer coil; and the primary transformer coil is coupled to the secondary transformer coil; and
wherein the method comprises:
adjusting, by the DC conversion circuit, an initial voltage input to the DC conversion circuit based on an operating voltage of the transformer to obtain a target voltage, wherein the target voltage is applied to the primary transformer coil;
generating, by the pulse width control circuit, a pulse square wave based on the target voltage, and adding the pulse square wave to the primary transformer coil, wherein a voltage of the pulse square wave is the same as the target voltage;
inducting, by the primary transformer coil, an electromagnetic field based on the pulse square wave, and coupling the electromagnetic field to the secondary transformer coil; and
generating, by the secondary transformer coil, an induced current based on the electromagnetic field, and generating an output voltage based on the induced current.

15. The method according to claim 14, wherein the DC conversion circuit comprises a boost DC conversion circuit, and the adjusting, by the DC conversion circuit, the initial voltage input to the DC conversion circuit based on the operating voltage of the transformer to obtain the target voltage, comprises:
increasing, by the boost DC conversion circuit, the initial voltage to reach the target voltage based on the operating voltage of the transformer.

16. The method according to claim 14, wherein the DC conversion circuit comprises a buck DC conversion circuit, and the adjusting, by the DC conversion circuit, the initial voltage input to the DC conversion circuit based on the operating voltage of the transformer to obtain the target voltage, comprises:
reducing, by the buck DC conversion circuit, the initial voltage to reach the target voltage based on the operating voltage of the transformer.

17. The method according to claim 14, wherein the DC conversion circuit comprises a boost-buck DC conversion circuit, and the adjusting, by the DC conversion circuit, the initial voltage input to the DC conversion circuit based on the operating voltage of the transformer to obtain the target voltage, comprises:
increasing or decreasing, by the boost-buck DC conversion circuit, the initial voltage to reach the target voltage based on the operating voltage of the transformer.

18. The method according to claim 14, further comprising:
feeding, by a feedback circuit, the output voltage back to the pulse width control circuit to allow the pulse width control circuit to adjust the pulse square wave.

19. The method according to claim 14, further comprising:
increasing, by a first input capacitor, the initial voltage to allow the initial voltage to be not lower than the minimum operating voltage of the DC conversion circuit.

20. The method according to claim 18, wherein the feedback circuit comprises a feedback coil, the feedback coil is configured to sense a voltage change of the secondary transformer coil and obtains a feedback signal of the secondary transformer coil.

* * * * *